United States Patent Office 3,500,180
Patented Mar. 10, 1970

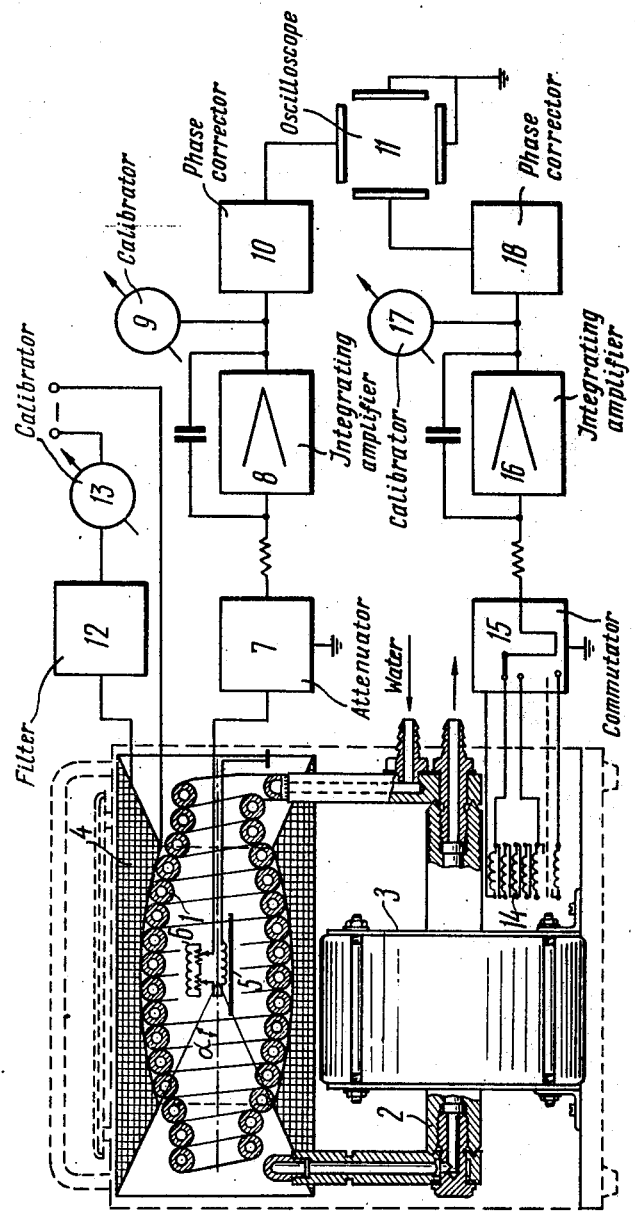

3,500,180
FERROMETER FOR OSCILLOGRAPHIC MEASUREMENT OF MAGNETIC CHARACTERISTICS
Vitaly Moritsovich Mogilevsky, Ulitsa Gogolya 17, kv. 39, Novosibirsk, U.S.S.R.
Filed Mar. 12, 1968, Ser. No. 712,505
Int. Cl. G01r 33/00
U.S. Cl. 324—34    3 Claims

ABSTRACT OF THE DISCLOSURE

A ferrometer for oscillographic measurement of the magnetic characteristics of bar-type test samples of ferromagnetic materials being magnetized in complex fields, the ferrometer including a magnetization device in the form of a confocal ellipsoidal winding and a winding in the form of a body of rotation limited externally by a cylindrical surface and at its ends by conical surfaces. An optimal homogeneity of the field is achieved by selecting a particular ratio of the geometrical parameters of the windings. The field pick-up is a toroidal coil with identical sections whose function is that of an attenuator.

---

The present invention relates to devices used for making express-measurements of the magnetic characteristics of various materials and, in particular, to ferrometers for oscillographic measurement of the magnetic characteristics of bar-type test samples under conditions of complex magnetization.

Known in the art are ferrographs fitted with magnetizing devices employing coaxial multi-layer cylindrical solenoids. Among the disadvantages of such devices is their low factor of utilization of the solenoid internal space due to the non-uniformity of the magnetic field that affects the accuracy of measurement and, also, the difficulty of cooling the instrument windings when strong magnetic fields are set up.

It has been proposed to use ferrometers provided with magnetizing solenoids in the form of a single-layer ellipsoid of revolution made of a tubular conductor connected to the secondary winding of a current transformer and a confocally-wound cylindrical-ellipsoidal winding that produces a constant field of magnetization or a high-frequency field.

A disadvantage of the above-mentioned ferrometer is that it is extremely difficult to wind ellipsoidal solenoids so as to ensure a constant density of its ampere-turns along the axis of rotation (Maxwell condition) since the conductor is to be laid with a variable pitch along the frame of the solenoid. Additionally that, the field measuring element of this ferrometer is of very complicated design and employs a uniaxial nonreactive measuring resistor that requires the introduction of an expensive calibrated step-type resistance-capacitance attenuator into the field intensity channel.

A primary object of the present invention is to provide a ferrometer having high-accuracy measuring characteristics and of simplified design.

A still further object is to provide a ferrometer manufactured by simple means and of low cost.

These and other objects are attained by the development of a ferrometer provided with a magnetizing device that makes it possible to obtain a homogeneous magnetic field of high strength per unit of weight of the instrument, said device being of a relatively simple design and easy to manufacture.

In accordance with this invention the herein-proposed ferrometer is provided with a magnetizing device comprising a single-layer ellipsoidal winding having a constant pitch along its generatrix that is connected to the secondary winding of a step-down transformer and coupled inductively with a coil-type field measuring element capable of controlling discretely the amplitude of the signal generated in proportion to the field strength of the single-layer winding, and a multi-layer winding in the form of a body of revolution limited externally by a cylindrical surface and internally by the surface of the single-layer ellipsoidal winding, whereas its ends are in the form of conical surfaces that converge at the center of the single-layer winding at an apex angle $$\alpha = \arctan \frac{R_L}{L}$$

where: L is equal to one half of the length of the winding layer; $R_L$ is the end radius of the same layer of the winding; L, $R_L$ and the radius of the equatorial cross-section of the winding layer are selected so as to obtain a homogeneous magnetic field within the device.

It is advisable that $R_L$, L and contraction coefficient K of the ellipse forming the surface of rotation passing through the center of the cross-sections of the winding layer turns be interrelated by the following equation:

$$K = -0.007\left(\frac{R_L}{L}\right)^2 + 1.568\left(\frac{R_L}{L}\right) + 0.001$$

In accordance with the present invention, the field measuring element may be a toroidal coil made up of identical helical-wound sections of a multi-core conductor having a series-cumulative connection and forming a multiple inductive divider at the connection of the measuring and compensating coils to the oscilloscope.

This gives the advantage of manufacturing the solenoid with a constant pitch of the winding turns by simple means, of increasing the magnetic field strength per unit weight of the measuring instrument and improving the accuracy of measurement.

The present invention will further be described by way of example with reference to the accompanying drawing in which the sole figure thereof shows an electric circuit diagram of the ferrometer for oscillographic measurement of magnetic characteristics in accordance with the herein proposed invention.

Ellipsoidal single-layer winding 1 of an industrial-frequency field winding of a tubular conductor and closed by hollow rod 2 is connected so that it serves as the secondary winding of a toroidal transformer 3. Multi-layer magnetizing winding 4 in the form of a body of revolution limited externally by a cylindrical surface of revolution, internally-by the surface of a symmetrically truncated ellipsoid of revolution and at its ends by surfaces of uniaxial cones of revolution with apexes directed towards the center of the solenoid is wound confocally to winding 1. The inner recess of winding 1 accommodates measuring coil 5 and compensating coil 6 having a series-cumulative connection. Coils 5 and 6 are connected to the input of magnetization channel I made up of step attenuator 7, integrating amplifier 8, calibrator 9 and phase corrector 10 the output of which is connected to the vertical plates of oscillograph unit 11. Magnetizing winding 4 is connected to the source of magnetizing current via tuning filter 12 and calibrator 13 of the magnetizing field. Rod 2 is coaxial with the field measuring element and toroidal coil 14 wound on a non-magnetic frame of helical multi-core conductor so that the windings made of the conductor cores have a series-cumulative connection and make up sections the taps of which are connected to selector switch 15. The output of selector switch 15 is connected to the input of the industrial-frequency magnetizing field H channel that is made up of integrating amplifier 16, field calibrator 17 and phase corrector 18, the output of the latter being connected to the horizontal plates of oscillograph unit 11. Calibrators 9, 13 and 17 are meters for measuring voltage amplitude, e.g. peak voltmeters whose scale is graduated in magnetic units. The calibrator 9 for magnetization winding 1 is provided with a scale graduated in magnetization units. The calibrator 13 for the winding 4 is provided with a scale graduated in magnetization units. The calibrator 17 for the field intensity channel H is provided with a scale graduated in the magnetic field intensity units. By means of the calibrators 9 and 17 it is possible to determine the scale of the hysteresis loop image on the screen of oscillographic unit 11.

In order to ensure an optimum homogeneity of the complex magnetic field, industrial-frequency single-layer winding 1 is wound with a constant pitch along the ellipsoid generatrix so that the following relationship is established between the end radius of the winding layer $R_L$, the half length L of the same winding layer and the contraction coefficient K of the ellipsoid generatrix;

$$K = 0.007\left(\frac{R_L}{L}\right)^2 + 1.568\left(\frac{R_L}{L}\right) + 0.001 \quad (1)$$

Multi-layer cylindrical-ellipsoidal winding 4 of the magnetizing field is wound in a similar manner, relationship (1) being observed for each layer by the providing of conical frame ends tapered so that the angle between the axis of rotation and the generatrix of the cone equals:

$$\alpha = \arctan \frac{R_L}{L}$$

The ferrometer operates in the following manner.

At industrial-frequency supply of the primary winding of transformer 3, solenoid 1 which serves as the secondary winding of transformer 3 produces a homogeneous magnetic field of industrial frequency and high strength, as bar 2 and winding 1 being cooled by a flow of cooling water. Magnetizing winding 4 is connected to a source of D.C. or A.C. supply. With D.C. supply, filter 12 is tuned for 50 c.p.s. resonance and with high-frequency AC supply, the filter is tuned for series resonance with winding 4 to the frequency of the source of supply. As has been stated hereinbefore, magnetizing field calibrator 13 is graduated in units of the magnetic field. At introduction of the bar test sample into the measuring coil, an electromotive force directly proportional to the derivative of the sample magnetization in time is induced in coil 5. Simultaneously, an electromotive force directly proportional to the derivative of the industrial-frequency field of solenoid 1 is induced in field measuring element 14. These electromotive forces are amplified by integrating amplifiers 8 and 16, phased by phase correctors 10 and 18 and are supplied to the deflecting plates of oscillograph unit 11. As a result, a Lissajou figure in the form of a hysteresis loop of magnetization $4\pi I = f(H)$ appears on the screen of the oscillograph. The parameters of the apexes of the symmetrical cycle hysteresis loop and the displacement of the loop at magnetization are determined by means of calibrators 9, 17 and 13. The scale of the hysteresis loop image is varied along axis I by means of attenuator 7 and along axis H by means of selector switch 15 coupled with the sections of the field measuring element-toroidal coil 14 having a series-cumulative connection and making up a multiple inductive divider at the connection of measuring and compensating coils 5 and 6 to oscillograph unit 11.

The herein proposed ferrometer has the following advantages over the known ferrometers:

(a) a simpler process of manufacturing the ellipsoidal windings and the field measuring element;

(b) an improvement of the magnetic field homogeneity and, consequently, a higher accuracy of measurement.

What we claim is:

1. A ferrometer for oscillographic measurement of the magnetic characteristics of magnetically hard materials under conditions of complex magnetization, comprising: an oscilloscope; separate magnetization and magnetizing field channels connected to the deflecting plates of the oscilloscope and including a series-connected integrating amplifier, calibrator and phase corrector; a magnetizing device; measuring and compensating coils placed in the field of the above-mentioned magnetizing device and connected to the input of the above-mentioned magnetization channel; a coil-type field measuring element provided within the magnetizing device capable of controlling discretely the signal amplitude and connected to the input of the above-mentioned magnetizing field channel; a step-down transformer; the magnetizing device being constituted as a single-layer ellipsoidal winding having a constant pitch along its generatrix connected to the secondary winding of said step-down transformer and coupled inductively with the coil-type field measuring element capable of controlling discretely the amplitude of the signal generated in proportion to the strength of the single-layer winding field and a multi-layer winding in the form of a body of revolution limited externally by a cylindrical surface and internally by the surface of the single-layer ellipsoidal winding, whereas its ends are in the form of conical surfaces that converge at the center of the single layer winding with an apex angle $$\alpha = \arctan \frac{R_L}{L}$$

where: L is equal to half of the length of the winding layer; $R_L$ is the end radius of the same layer of the winding: L, $R_L$ and the radius of the equatorial cross-section of the winding layer being selected so as to obtain a homogeneous magnetic field within the device.

2. A ferrometer according to claim 1, wherein $R_L$, L and contraction coefficient K of the ellipse forming the surface passing through the centers of the cross-sections of the winding layer are interrelated by the following equation $$K = -0.007\left(\frac{R}{L}\right)^2 + 1.568\left(\frac{R}{L}\right) + 0.001$$

3. A ferrometer according to claim 1, wherein the field measuring element is a toroidal coil made up of identical helical-wound sections of a multi-core conductor having a series-cumulative connection and forming a multiple inductive divider at the connection of the measuring and compensating coils to the oscilloscope.

References Cited

UNITED STATES PATENTS 3,040,246   6/1962   Lundin _____ 324—40 XR

OTHER REFERENCES

Blomberg and Karttunen; Jour. Inst. Elec. Engr.; August 1958, pp. 449–453.

ALFRED E. SMITH, Primary Examiner